April 1, 1930.
H. GRESS
1,752,380
KEY AND LICENSE HOLDER
Filed May 29, 1928
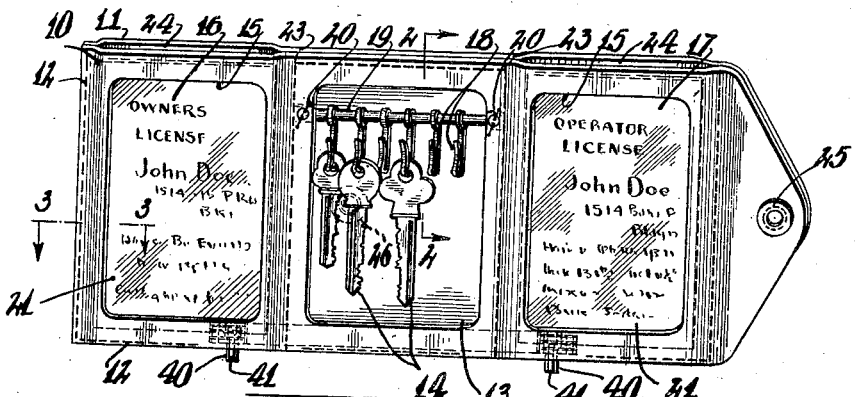
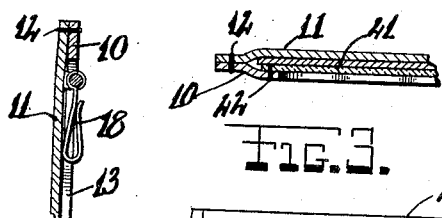
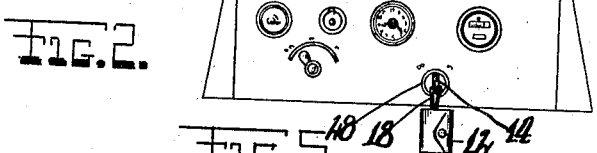
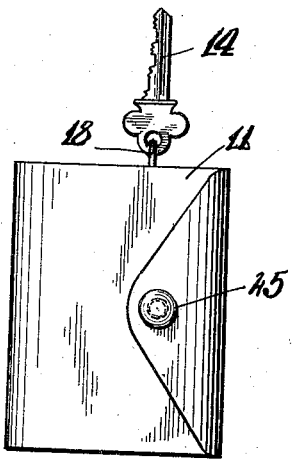
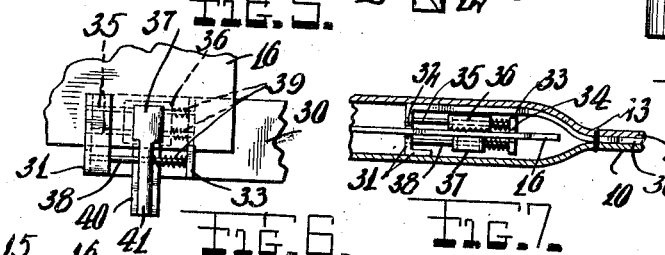
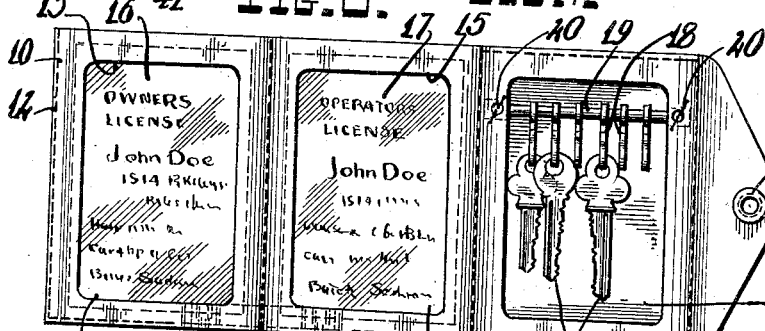
INVENTOR.
Henry Gress
BY
ATTORNEY Patented Apr. 1, 1930

1,752,380

UNITED STATES PATENT OFFICE

HENRY GRESS, OF SOUTH OZONE PARK, LONG ISLAND, NEW YORK

KEY AND LICENSE HOLDER

Application filed May 29, 1928. Serial No. 281,392.

This invention relates generally to holders, and has more particular reference to a novel key and license holder.

The invention has for an object the provision of a device of the class mentioned which is of simple durable construction, dependable and efficient in action, and which can be manufactured and sold at a reasonable cost.

The invention proposes the use of a holder preferably made of sheet leather and provided with a central key holding section and end license holding sections. The holder should be bendable into closed position and thus held by fasteners, and the keys supported in the holder should be arranged for pivoting upwards so as to project from the holder. It is pointed out that this arrangement permits the key which projects to be engaged in a lock on a dashboard of an automobile, while the holder is in closed position. This feature is very desirable in that it provides a visible sign for reminding a vehicle driver to lock his car upon stopping, and then the key is easily swung into the holder for placement into the driver's pocket. The licenses are viewable thru windows in the holder, and a means may be provided for preventing a possible falling out of the licenses.

For further comprehension of the invention, and of the objects and advantages thereof, reference will be had to the following description and accompanying drawings, and to the appended claims in which the various novel features of the invention are more particularly set forth.

In the accompanying drawing, forming a material part of this disclosure:—

Fig. 1 is a perspective view of a device constructed according to this invention.

Fig. 2 is a fragmentary vertical sectional view, taken on the line 2—2 of Fig. 1.

Fig. 3 is a fragmentary horizontal sectional view, taken on the line 3—3 of Fig. 1.

Fig. 4 is an elevational view of the device in closed position.

Fig. 5 is an elevational view of the dashboard of a car with the device applied.

Fig. 6 is an enlarged detail elevational view of one end of the license holding means.

Fig. 7 is a plan view thereof, shown applied to a horizontal sectional portion of the holder.

Fig. 8 is a similar view to Fig. 1 but showing a modified arrangement of the licenses.

The reference numeral 10 indicates generally the inner material of a holder having an outer sheet 11, both preferably made of leather and secured together by stitches 12. The inner sheet 10 has a central cutout portion 13 for keys 14, and end cutout portions 15 for licenses, such as an "Owner" license 16 and a "Driver" license 17.

The keys 14 are engaged on clips 18 pivotally mounted on a rod 19 extending across the central opening 13, and thus secured by stitches 20 passing thru the sheets 10 and 11, and apertures in the rod 19. The end cutouts 15 are covered on their rear sides with transparent sheets 21 secured in place by stitches 22, and the licenses 16 and 17 are disposed between the sheets 21 and the material 11. Vertical rows of stitches 23 separate the license pockets from the key portion of the device.

As indicated by numerals 24 the top portion of the device is left open for providing a passage to enter the licenses in place within the device. A snap fastener socket 25 is secured to one end of the material 10 and 11 and is engageable with a snap fastener stud 26 on the material 11 for holding the device folded together as shown in Fig. 4. To fold the device as shown, first the section containing license 16 is bent upon section 13, then the section containing license 17 is bent over section 16, and the snap fasteners engaged.

In Fig. 5 a dashboard is indicated generally by the numeral 27, and has an ignition lock 28 engaged by one of the keys 14 while the holder for the key is suspended by the clip 18. In Fig. 4 one key 14 is shown extended from the holder.

Between the materials 10 and 11, and extending across the central portion of the holder, is a bar 30 disposed behind the lower corners of both licenses. Each end of the bar is bent forward and across and shown at 31 and has a slot 32 for the passage of the license. Near each of the ends of the bar 30, a projection 33 extends forwards from the bar 30 and has a slot 34 for the passage of the license. A guide rod 35 extends between the projection 33 and the end 31 and slidably supports one portion 36 of a paper clamp having another coacting pivoted portion 37 mounted on rod 38 extended between projection 33 and end 31. Springs 39 act to move these clamps behind the cross portion of the end 31 for locking purposes. Handles 40 and 41 project from the clamp portions 36 and 37 respectively for manually moving the clamps to free positions. This arrangement permits the licenses to be held against possible loss.

While I have shown and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:—

1. In a key and license holder of the class described, a bar disposed between and attached on the sheets forming the holder, and formed with a forward bent end with a lateral free extremity, a projection spaced from the bent end and attached on the bar, the bent end and projection being formed with slots arranged to receive the edge of a license, guide rods extended between the projection and said end, a license clamp mounted on the guide rods, and springs on the rods normally urging the license clamp behind the said lateral free extremity of the forward bent end for preventing opening of the clamp.

2. In a key and license holder of the class described, a bar disposed between and attached on the sheets forming the holder, and formed with a forward bent end with a lateral free extremity, a projection spaced from the bent end and attached on the bar, the bent end and projection being formed with slots arranged to receive the edge of a license, guide rods extended between the projection and said end, a license clamp mounted on the guide rods, and means for normally urging the license clamp behind the said lateral free extremity of the forward bent end for preventing opening of the clamp.

3. In a key and license holder of the class described, a bar disposed between and attached on the sheets forming the holder, and formed with a forward bent end with a lateral free extremity, said forward bent end being formed with a slot arranged to receive the edge of a license, guide rods mounted on the said end, a license clamp mounted on the guide rods, and springs on the rods normally urging the license clamp behind the said lateral free extremity of the forward bent end for preventing opening of the clamp.

In testimony whereof I have affixed my signature.

HENRY GRESS.